United States Patent [19]

Puhk

[11] 4,271,283

[45] Jun. 2, 1981

[54] SUSPENSION POLYMERIZATION PROCESS FOR PRODUCING LARGE POLYMER PARTICLES

[75] Inventor: Heino Puhk, North Olmsted, Ohio

[73] Assignee: SCM Corporation, New York, N.Y.

[21] Appl. No.: 63,345

[22] Filed: Aug. 2, 1979

Related U.S. Application Data

[63] Continuation-in-part of Ser. No. 954,553, Oct. 25, 1978, abandoned, which is a continuation-in-part of Ser. No. 889,149, Mar. 23, 1978, abandoned.

[51] Int. Cl.³ .................. B32B 27/30; C08F 220/04; C08F 220/06; C08F 220/20
[52] U.S. Cl. ..................................... 526/317; 428/402
[58] Field of Search ................ 526/317, 320; 428/402

[56] References Cited

U.S. PATENT DOCUMENTS

| Re. 21,738 | 2/1940 | Kistler et al. | 526/317 |
| 3,580,896 | 5/1971 | Farber | 526/317 |
| 3,595,823 | 7/1971 | Huang | 526/317 |
| 4,056,503 | 11/1977 | Powanda et al. | 526/320 |

*Primary Examiner*—Harry Wong, Jr.
*Attorney, Agent, or Firm*—Thomas M. Schmitz

[57] ABSTRACT

Particle size of suspension polymer particles is controlled in the suspension polymerization of a mixture of ethylenically unsaturated monomers including an ethylenically unsaturated monocarboxylic acid and pentaerythritol triacrylate by increasing the proportion of pentaerythritol triacrylate in said monomer mixture to increase the size of the suspension polymer particles.

4 Claims, No Drawings

SUSPENSION POLYMERIZATION PROCESS FOR PRODUCING LARGE POLYMER PARTICLES

This application is a continuation-in-part of application Ser. No. 954,553 filed Oct. 25, 1978, now abandoned, which is a continuation-in-part of application Ser. No. 889,149 filed Mar. 23, 1978, now abandoned.

BACKGROUND OF THE INVENTION

This invention relates to suspension polymerization and more particularly to a process for producing large suspension polymer particles.

Conventional suspension polymerization processes ordinarily produce polymer particles larger than about 5 microns, and quite often between about 10 and 300 microns, and particle sizes even larger. In contrast, conventional latex polymerization process typically produce relatively small polymer particles between about 0.1 and 1 micron. With respect to extraordinarily large polymer particles, Wright patents U.S. Pat. No. 3,488,745 and U.S. Pat. No. 3,755,282 disclose methods particularly dependent upon the use of surfactants to control polymer particle size and produce large polymer beads. The prior art processes make use of persulfates, bisulfides, phosphates, sulfonate and sulfamates as surface active stabilizing agent sometimes referred to in the patents as surface active extender agents.

It now has been found that the inclusion of pentaerythritol triacrylate in the ethylenically unsaturated monomer combination copolymerized in the suspension polymerization process effectively controls and substantially increases the polymer particle size by increasing the relative amounts of pentaerythritol triacrylate. The process is a substantially improved process for substantially increasing the polymer particle size without the assistance of high levels of surface active extender agents by polymerizing the ethylenically unsaturated monomers in an aqueous medium wherein the liquid monomer combination contains minor amounts of an ethylenically unsaturated monocarboxylic acid in combination with pentaerythritol triacrylate. The resulting polymer particle size is greater than about 150 microns and preferably greater than 850 microns related to increased amounts of said triacylate. The process advantageously avoids excess amounts of extender surface active agents which help to stabilize the polymer particles but quite often detrimentally affect the physical integrity properties due to the polar groups on such surface agents and attendant water sensitivity. These and other advantages will become more apparent by referring to the Detailed Description of the Invention.

SUMMARY OF THE INVENTION

A suspension polymerization process for producing large size polymer particles comprisees the suspension polymerization of ethylenically unsaturated monomers including by weight between 25% and 50% pentaerythritol triacrylate, between about 1% and 10% ethylenically unsaturated monocarboxylic acid, with remaining being other ethylenic monomers wherein the resulting suspension polymer particles are greater than about 150 microns.

DETAILED DESCRIPTION OF THE INVENTION

The process of this invention is based on the suspension polymerization of considerable amounts of pentaerythritol triacrylate copolymerized with minor amounts of unsaturated monocarboxylic acid with the remainder being other ethylenically unsaturated monomers.

Pentaerythritol triacrylate is of primary importance in producing large size polymer particles greater than about 150 microns. On a weight basis, the ethylenic monomer mixture contains between about 25% and 50% pentaerythritol triacrylate which surprisingly increases the size of polymer particles relative to increased levels of the triacrylate. Pentaerythritol triacrylates have the following structure:

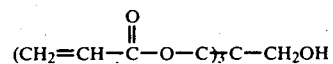

and functions contrary to expectations that increased levels of a polyfunctional acrylates ordinarily are expected to cause smaller suspension polymer particles to form. Hexamethylenediacrylate, for instance, reduces the polymer particle size at increased levels of acrylate. Other similar acrylates such as trimethylolpropane triacrylate or epoxide diacrylate similarly produce substantial levels of small particle size suspension polymer particles. Thus, increased amounts of pentaerythritol triacrylate in accordance with this invention produces proportionately larger suspension polymer particles.

A further aspect of this invention pertains to the inclusion in the monomers of between about 1% and 10% by weight of ethylenically unsaturated monocarboxylic acid such as acrylic or methacrylic acid or other alkylacrylic acid such as ethylacrylic acid or similar unsaturated aliphatic monocarboxylic acid as well as mono-alkyl esters of unsaturated dicarboxylic acids such as fumaric, maleic, and itaconic. The preferred ethylenically unsaturated monocarboxylic acids are acrylic and/or methacrylic acids.

Referring now to the ethylenically unsaturated monomers, such ethylenic monomers include, for example, lower alkyl esters of acrylic or methacrylic acid such as methyl acrylate or methacrylate, the propyl acrylates or methacrylates, the butyl acrylates or methacrylates, 2-methylhexyl acrylate, n-octyl acrylate, 2-ethylhexyl acrylate, octyl methacrylate, and similar alkyl acrylates or methacrylates. Ethylenic monomers can further include conjugated dienes such as butadiene and isoprene; alphaolefius such as ethylene, propylene and isobutylene; vinyl halides; vinyl esters such as vinyl acetate; vinyl aromatics such as styrene, alpha-methyl styrene, vinyl toluene, alkyl vinyl ethers such as methyl vinyl ether, isopropyl vinyl ether, n-butyl vinyl ether and isobutyl vinyl ether; acrylontrile, methacrylonitrile, acrylamide, methacrylamide and similar alkyl acrylamides, and allyl monomers such as allyl glycidyl ether and allyl alcohol, as well as mixture of any of the foregoing ethylenically unsaturated monomers.

The particular proportions of monomers in the monomer mixture depend upon a variety of formulating factors such as polymer physical properties desired, the glass transition temperature (Tg) desired and the intended use of the suspension polymer particles such as molded plastic articles, additives to fiberglass thermosetting resins and specialty matte paint coatings. The particle size is controlled in accordance with this invention by the relative amounts of pentaerythritol wherein increased amounts generate larger polymer particles. The monomer mixture comprises on a weight basis between about 25% and 50% pentaerythritol, between about 1% and 10% ethylenically unsaturated monocarboxylic acid, and the remainder being other ethylenically unsaturated monomers.

In practicing this invention, the monomer mixture is fed over a period of time to an aqueous suspension polymerization medium in the presence of a free radical initiator which generally is soluble in the monomer mixture and insoluble in water. Suitable free radical initiators include, for example, peroxides such as benzoyl peroxide, tert-butyl peroxide, cumene hydroperoxide, tetralin hydroperoxide, diisopropyl benzene hydroperoxide, acetyl peroxide, urea peroxide, methyl ethyl ketone peroxide, diisopropyl peroxy dicarbonate, hexachloroethane/tetraborate (1%/1%), hydrazine sulfate (3%), sodium persulfate/sodium tetraborate (1%/1%), dibenzoylhydrazine (5%), tetraethyllead (3%), azobisisobutyronitrile, and the like, and mixtures thereof. The proportion of free radical initiator by weight of the mixture of vinyl monomers in the process is at least about 0.2 and preferably between about 0.8 and 2.0%.

Surfactants ordinarily are used for stably dispersing the monomer phase as particles in the aqueous medium. Suitable surfactants for use in the present process include, for example, various phosphates (generally about 0.02 to 5% by weight of the monomer mixture), such as tricalcium phosphate, hydroxy-apatite, magnesium phosphate and the like; various sulfonates such as alkali metal sulfonates, alkylated sulfonates and the like; polyvinyl alcohols; celluloses, such as hydroxyethylcellulose and the like; polyvinyls, such as polyvinyl pyrrolidone, poly(methylvinylether-maleic anhydride) and the like; such as sodium sodium laurylsulfate and the like; and a wide variety of other surfactants well known in the art.

Suspension polymerization can be carried out at temperatures of around 60° to 100° C. using a monomer to water weight ratio of about 0.1 to 1.5:1 and preferably of about 0.3 to 1:1 with reaction times being from about 2 to 6 hours. Typically, the initiator and monomer mixture are blended with appropriate surfactants and added to the aqueous medium either as an entire lot or with metered additions of the monomer mixture to the aqueous medium. Alternatively, the surfactant and initiator may be intially dispersed in the aqueous medium prior to the addition of the monomer mixture thereto. Any conventional suspension polymerization process is suitable for use in the present invention.

Of importance in the present process is that as the weight proportion of pentaerythritol triacrylate is increased in the monomer mixture, the average particle size (average particle diameter) of the resulting suspension polymer particles or beads increases. Generally, from about 25% to about 50% by weight pentaerythritol triacrylate in the monomer mixture is suitable in the present invention. In contrast, increasing the levels of other polyvinyl monomers decreases the particle size of the suspension polymer particles as will become more apparent in the examples.

The following examples show how the present invention can be practiced wherein all temperatures are in degrees Centigrade and all weight percentages and proportions are by weight.

EXAMPLE

Several suspension polymerization runs were conducted using a variety of mixtures of ethylenic monomers. For all runs, substantially identical reaction conditions were maintained so that the average particle size the resulting suspension polymer particles would be the result of the level of pentaerythritol triacrylate.

The following reaction conditions were used in each run:

| Reactor Size | 5 liters |
| --- | --- |
| Benzoyl Peroxide Initiator | 1% by weight of monomer mixture |
| Monomer mixture: water (weight ratio) | 0.29 |
| % of non-volatile solids (theoretical product polymer suspension) | 23% |
| Polyvinylalcohol (surfactant) | 1.1% by weight of monomer mixture |
| Tg | −1° C. (of monomers without polyvinyl monomer) |

In all runs, the monomer mixture, initiator, and surfactant dispersed in water (monomer to water ratio of 0.9) at room temperature were subjected to turbulent agitation (fixed stirrer at 2,000 rpm) to produce fine droplets of the monomer mixture in the aqueous medium as the continuous phase. This mixture then was charged into a reactor containing additional water heated to about 88° C. Thereafter, the contents of the reactor were held at a temperature of about 79° C. for 5 hours under agitation (about 80–120 rpm) to produce the product polymer suspension. About 96 to 99% of the feed monomer mixture was converted into the product suspension polymer particles. The resulting polymer particles then were screened to determine their particle sizes. The following table details all the runs wherein monomers indicated are composition by weight and the sieve analysis is the weight retained as measured by U.S. Standard Sieve Series.

| | MONMER COMPOSITION | | | | | | SIEVE ANALYSIS | | | |
| --- | --- | --- | --- | --- | --- | --- | --- | --- | --- | --- |
| | | | | | | | 20 mesh | 100 mesh | 150 mesh | through 150 mesh |
| Run No. | DERDA | TMPTA | PETA | MMA | BA | MAA | (850 microns) | (150 microns) | (106 microns) | (106 microns) |
| 1 | — | — | 25 | 35.3 | 35.3 | 4.4 | 9 | 87 | 4 | — |
| 2 | — | — | 50 | 23.5 | 23.5 | 3.0 | 96 | 4 | — | — |
| 3 | — | — | 2.5 | 45.9 | 45.9 | 5.7 | — | 2 | 2 | 96 |
| 4 | — | — | 5.0 | 44.7 | 44.7 | 5.6 | — | 2 | 5 | 93 |
| 5 | — | 5 | — | 44.7 | 44.7 | 5.6 | — | 2 | 11 | 87 |
| 6 | — | 25 | — | 35.3 | 35.3 | 4.4 | — | — | 3 | 97 |
| 7 | — | 50 | — | 23.5 | 23.5 | 3.0 | — | 2 | 1 | 97 |
| 8 | 5 | — | — | 44.7 | 44.7 | 5.6 | — | 82 | 4 | 14 |

| Run No. | MONMER COMPOSITION | | | | | | SIEVE ANALYSIS | | | |
|---|---|---|---|---|---|---|---|---|---|---|
| | DERDA | TMPTA | PETA | MMA | BA | MAA | 20 mesh (850 microns) | 100 mesh (150 microns) | 150 mesh (106 microns) | through 150 mesh (106 microns) |
| 9 | 25 | — | — | 35.3 | 35.3 | 4.4 | 2 | 4 | 2 | 92 |

DERDA : diacrylate of Dow Epoxy Resin DER 332, epoxide equivalent weight 173-196, Dow Chemical Company
TMPTA : trimethylolpropane triacrylate
PETA : pentaerythritol triacrylate
MMA : methyl methacrylate
BA : butyl acrylate
MMA : methacrylic acid Run Nos. 1 through 4 inclusive illustrate the effect of increasing the level of pentaerythritol triacrylate in accordance with this invention to produce larger particle size suspension polymer particles. In contrast, increased levels of similar polyvinyl monomers shown in Run Nos. 5 through 9 inclusive decreases the resulting particle size suspension polymer particles as normally expected in prior art processes. The foregoing examples illustrate the merits of this invention wherein pentaerythritol triacrylate is utilized to control polymer particle size and particularly increased levels produce increased particle size; however, the examples are not intended to be limited except as defined by the appended claims.

I claim:

1. An aqueous suspension polymerization process for producing suspension polymer particles by polymerizing a mixture of ethylenically unsaturated monomers in an aqueous medium under suspension polymerization conditions to produce polymer particles greater than about 150 microns, the improvement comprising:

providing a monomer mixture comprising by weight between about 25% and 50% pentaerythritol triacrylate, 1% and 10% ethylenically unsaturated monocarboxylic acid monomer, and the remainder being other ethylenically unsaturated monomer.

2. The process of claim 1 wherein said ethylenically unsaturated monocarboxylic acid is an alpha-, beta-ethylenically unsaturated monocarboxylic acid.

3. The process of claim 2 wherein said monocarboxylic acid is acrylic acid or an alkyl acrylic acid.

4. The process of claim 3 wherein said alkyl acrylic acid is a $C_1-C_{10}$ alkyl alcrylic acid.

* * * * *